(12) United States Patent
Rekimoto (10) Patent No.: US 8,477,115 B2
(45) Date of Patent: Jul. 2, 2013

(54) INPUT DEVICE, INFORMATION PROCESSING APPARATUS, INFORMATION PROCESSING METHOD, AND PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 887 days.

(21) Appl. No.: 11/447,973

(22) Filed: Jun. 7, 2006

(65) Prior Publication Data
US 2006/0284858 A1 Dec. 21, 2006

(30) Foreign Application Priority Data
Jun. 8, 2005 (JP) ................................. 2005-168699

(51) Int. Cl.
G06F 3/045 (2006.01)
G08C 21/00 (2006.01)

(52) U.S. Cl.
USPC ..... 345/174; 345/173; 178/18.03; 178/18.05; 178/18.06; 178/18.07

(58) Field of Classification Search
USPC ................ 345/156, 157, 160, 161, 163, 167, 345/168, 169, 173, 174, 179; 178/18.01, 178/18.03, 18.05, 18.06, 18.07
See application file for complete search history.

(56) References Cited

U.S. PATENT DOCUMENTS

| | | | | |
|---|---|---|---|---|
| 5,241,308 A * | 8/1993 | Young | | 341/34 |
| 5,475,401 A * | 12/1995 | Verrier et al. | | 345/179 |
| 6,369,803 B2 * | 4/2002 | Brisebois et al. | | 345/173 |
| 6,975,307 B2 * | 12/2005 | Chang et al. | | 345/174 |
| 7,088,342 B2 * | 8/2006 | Rekimoto et al. | | 345/169 |
| 7,336,260 B2 * | 2/2008 | Martin et al. | | 345/169 |
| 7,477,231 B2 * | 1/2009 | Asai | | 345/104 |
| 2001/0050691 A1 | 12/2001 | Komata | | |
| 2002/0008691 A1 | 1/2002 | Hanajima et al. | | |
| 2002/0180763 A1 | 12/2002 | Kung | | |
| 2003/0071797 A1 * | 4/2003 | Chang et al. | | 345/173 |
| 2003/0189552 A1 | 10/2003 | Chuang et al. | | |
| 2004/0201580 A1 * | 10/2004 | Fujiwara et al. | | 345/179 |
| 2008/0303799 A1 * | 12/2008 | Schwesig et al. | | 345/173 |

FOREIGN PATENT DOCUMENTS

| | | |
|---|---|---|
| JP | 04-060715 | 2/1992 |
| JP | 07-129312 | 5/1995 |
| JP | 2000-259315 | 9/2000 |

(Continued)

OTHER PUBLICATIONS

European Search Report for related EP Patent Application No. 06 25 2974, dated Oct. 31, 2012.

Primary Examiner — My-Chau T Tran
(74) Attorney, Agent, or Firm — Sherr & Jiang, PLLC (57) ABSTRACT

An input device includes: a contact detector configured to detect at least a size of contact area by detecting a physical contact with a control input section; a pressure detector configured to detect a pressure applied by the physical contact; and a controller configured to output signals in response to detection outputs from the contact detector and the pressure detector. The controller outputs a first signal carrying a value which varies in response to the pressure detected under a state of contact in which a contact detection result indicates that the detected contact area is equal to or smaller than a predetermined contact area, and outputs a second signal carrying a value which varies in response to the pressure detected under a state of contact in which the contact detection result indicates that the detected contact area is greater than the predetermined contact area.

6 Claims, 9 Drawing Sheets

FOREIGN PATENT DOCUMENTS

| | | |
|---|---|---|
| JP | 2002-366294 | 12/2002 |
| JP | 2003-280812 | 10/2003 |
| JP | 2005-018284 | 1/2005 |
| JP | 2005-18669 | 1/2005 |
| JP | 2005-31918 | 2/2005 |
| JP | 2005-38812 | 2/2005 |

* cited by examiner

INPUT DEVICE, INFORMATION PROCESSING APPARATUS, INFORMATION PROCESSING METHOD, AND PROGRAM

BACKGROUND OF THE INVENTION

1. Field of the Invention

The present invention relates to an input device configured to output a signal carrying a value (or controlled variable) which varies in response to input operations performed by a finger or the like contacting and pressing a control panel. The present invention also relates to an information processing apparatus, an information processing method, and a storage medium that stores a program, which use this input device.

2. Description of Related Art

Various input devices are known, through which input operation is performed to an information processing apparatus such as a personal computer. They include a keyboard, a mouse, a touch pad, a drawing tablet, a touch panel, a joystick, a trackball, and so on, and many improvements have been made to reduce their size and enhance their easiness of operation.

For example, Japanese Patent Application Publication Number 2005-18669 discloses a touch panel of a capacitive coupling type, in which a change in capacity corresponding to an area touched is detected falsely as pressing.

Japanese Patent Application Publication Number 2005-38812 discloses a pressing-pressure sensor having a structure in which the number of input points can be varied with high accuracy in response to the magnitude of a pressing force applied.

Moreover, Japanese Patent Application Publication Number 2005-31918 discloses a touch panel display apparatus that allows a user to have a feeling of more realistic operation.

SUMMARY OF THE INVENTION

When an input device, which uses a pressure sensor to change a value (or controlled variable) in response to pressing force applied by a finger or the like, the pressure value sensed by the input device takes a positive value from 0. Accordingly, the input device is capable of handling values that change in one direction from a reference value (or controlled variable), but encounters difficulty handling values that change in the opposite direction from the reference value (or controlled variable). For example, to zoom in or out on an image of a map in a navigation system or the like, a user can increase or decrease his/her pressing force to increase the zoom percentage from 0 (no zoom in/zoom out), or to step back to 0 (no zoom in/zoom out), but cannot zoom out from 0 (no zoom in/zoom out).

It is possible that, in addition to the pressure sensor, a switch is provided, whereby when the switch is turned off, the zoom-in level can be changed in response to pressing force from 0, whereas when the switch is turned on, the zoom-out level can similarly be changed in response to pressing force from O. However, this approach requires on/off switching operation. Such an operation is cumbersome, and may prevent a user from performing the continuous and smooth operation.

Alternatively, it is possible to switch the functions of zooming in and zooming out depending on, e.g., positions pressed. However, in this case also, the user needs to move the finger to different positions. Accordingly, such a construction may also prevent a user from performing the continuous and smooth operation.

It is desirable to provide an input device, an information processing apparatus, an information processing method, and/or a storage medium that stores a program, all enabling control an input in both positive and negative directions from zero without changing the position of a finger or the like. The present invention has been proposed in view of such circumstances of related art.

In the present invention, two kinds of values, namely a contact area and a pressing force by a finger or an input device that works similarly as the finger or the like, are utilized together using contact detection means and pressure detection means. Furthermore, the detected contact area is discriminated by a predetermined threshold whereby the detected pressure value can be interpreted in one of two directions, a positive or a negative direction from zero.

According to an embodiment of the present invention, there is provided an input device. The input device includes: contact detection means for detecting at least a size of a contact area by detecting a physical contact with a control input section; pressure detection means for detecting a pressure applied by the physical contact; and control means for outputting control signals in response to detection outputs from the contact detection means and the pressure detection means. The control means outputs a first control signal carrying a first value (or controlled variable) which varies in response to the pressure detected by the pressure detection means under a state of contact in which a contact detection result indicates that the contact area is equal to or smaller than a predetermined contact area, and outputs a second control signal carrying a second value (or controlled variable) which varies in response to the pressure detected by the pressure detection means under a state of contact in which the contact detection result indicates that a contact area is greater than the predetermined contact area.

Here, the contact detection means may be provided with a position detection function for detecting a position of the physical contact with the control input section.

According to another embodiment of the present invention, there is provided an information processing apparatus. The apparatus includes: an input device; and a plurality of function sections for performing processing in response to a signal obtained from the input device. The input device includes: contact detection means for detecting at least a size of a contact area by detecting a physical contact with a control input section; pressure detection means for detecting a pressure applied by the physical contact; and control means for outputting control signals in response to detection outputs from the contact detection means and the pressure detection means. The control means outputs a first control signal carrying a first value (or controlled variable) which varies in response to the pressure detected by the pressure detection means under a state of contact in which a contact detection result indicates that the contact area is equal to or smaller than a predetermined contact area, and outputs a second control signal carrying a second value (or controlled variable) which varies in response to the pressure detected by the pressure detection means under a state of contact in which the contact detection result indicates that a contact area is greater than the predetermined contact area.

An information processing method according to an embodiment of the present invention includes an input step, and a processing step of performing processing in response to a signal obtained by the input step. The input step includes a contact detection step of detecting at least a size of contact area by detecting a physical contact with a control input section, a pressure detection step of detecting a pressure applied by the physical contact, and a control step of outputting signals in response to detection outputs produced by the contact detection step and the pressure detection step. The control step executes first processing by a first signal carrying a value which varies in response to the pressure detected by the pressure detection step under a state of contact in which a contact detection result indicates a contact area equal to or smaller than a predetermined contact area, and executes second processing by a second signal carrying a value which varies in response to the pressure detected by the pressure detection step under a state of contact in which the contact detection result indicates a contact area greater than the predetermined contact area.

A program according to an embodiment of the present invention or a storage medium that stores such a program causes a computer to execute the above-mentioned information processing.

According to the present invention, a contact area touched by a finger or the like during input operation is combined with a pressure value. The contact area is discriminated using a predetermined threshold. A first signal carrying a first value (or controlled variable) which varies with pressure and a second signal carrying a second value (or controlled variable) which varies with pressure are switched for output. As a result, first processing and second processing may be selectively performed without causing a user to change the position of his/her finger on the control input section.

DETAILED DESCRIPTION OF EMBODIMENTS

Embodiments to which the present invention is applied will be described below with reference to the drawings.

Figure 1:
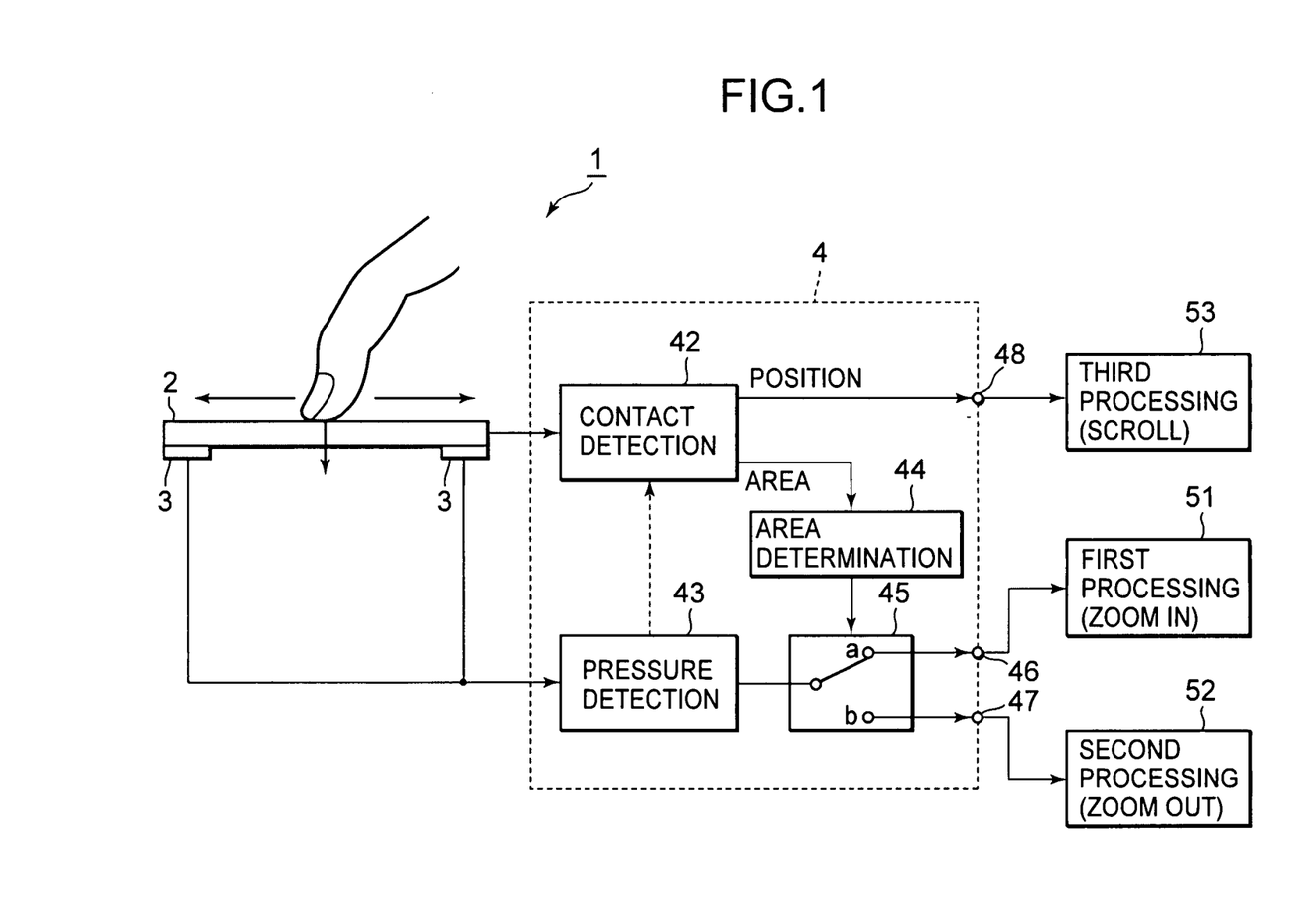
FIG. 1 is a block diagram schematically showing an input device in an embodiment of the present invention.

FIG. 1 is a block diagram schematically showing an input device in an embodiment of the present invention. An input device 1 includes, as shown in FIG. 1, a contact sensor section 2, pressure sensor sections 3, and a control section 4 for outputting a control signal in response to detected outputs from the contact sensor section 2 and the pressure sensor sections 3. In the present embodiment, it is assumed that the contact sensor section 2 may include a touch sensor, a touch pad, or a touch panel, and correspond to the contact detection means of, e.g., capacitive, resistive type, for detecting physical contact of a finger or the like or with a surface (control input surface). However, in the present embodiment, the structure of the contact detection means may not be limited to such types and may be other type of the contact detection means as long as such contact detection means can detect a contact area over which a user touches with his/her finger or the like. The contact sensor section 2 used for the input device 1 of this embodiment also has, as described later, a function of detecting contact position at which the user touches with the finger. The pressure sensor sections 3, which serves as means for detecting a physical contact pressure, detect a force (pressing force) applied thereto when the user presses the control input surface with the finger or the like. It is also called a pressure-sensitive sensor, or a pressure detecting element, and may include, e.g., a piezoelectric element, a pressure/electric-resistance transducer.

In the example of FIG. 1, the surface of a plate-shaped contact sensor section 2 serves as a control panel of the input device 1, and the pressure sensor sections 3 are disposed at, e.g., four corners of the underside of the contact sensor section 2, to support the plate-shaped contact sensor section 2. In this case, when the user touches and presses the surface of the contact sensor section 2, which serves as the control panel of the input device 1, with a finger or the like, a pressing force is applied to the pressure sensor sections 3 via the contact sensor section 2, whereby the pressing force through the finger or the like is detected by the pressure sensor sections 3. It should be noted that the input device 1 is not limited to the example shown in FIG. 1, but may include an example in which the plate-shaped contact sensor section is supported at, e.g., its four corners by spacers or the like, to allow a strain gauge or the like to be stuck to the underside of the contact sensor section to form a pressure sensor section. In this example, deformations of the plate-shaped contact sensor section by the finger or the like pressing the contact sensor section are detected by the strain gauge or the like, whereby a pressing force is detected.

The control section 4 includes a contact detection processing circuit 42 connected to the contact sensor section 2, and a pressure detection circuit 43 connected to the pressure sensor sections 3. The contact detection processing circuit 42 detects a contact position and a contact area touched by a finger or the like, to output a contact position information signal and a contact area information signal, which are electrical signals, respectively. The pressure detection circuit 43 detects a pressure (pressing force) applied by the finger or the like, to output an electric pressure detection signal. The contact area information signal from the contact detection processing circuit 42 is supplied to an area determination circuit 44 for comparison with a specified area threshold St, and the area determination circuit 44 then supplies a switching signal in response to the comparison result, to a switching selection circuit 45. The switching selection circuit 45 switches between terminals a, b in response to comparison results, to output the pressure detection signal from the pressure detection circuit 43. A first signal from the terminal a of the switching selection circuit 45 is supplied to a first processing function section 51 via an output terminal 46 of the control section 4, and a second signal from the terminal b of the switching selection circuit 45 is supplied to a second processing function section 52 via an output terminal 47 of the control section 4. Furthermore, the contact position information signal from the contact detection processing circuit 42 is supplied to a third processing function section 53 via an output terminal 48 of the control section 4, as necessary.

It should be noted that the first and second processing function sections 51, 52 include those performing zoom-in processing and zoom-out processing for displaying an image, and that the third processing function section 53 includes display position moving processing such as so-called scrolling or panning for moving a display area when a part of a large image area, such as a map, is displayed.

Figure 2A:
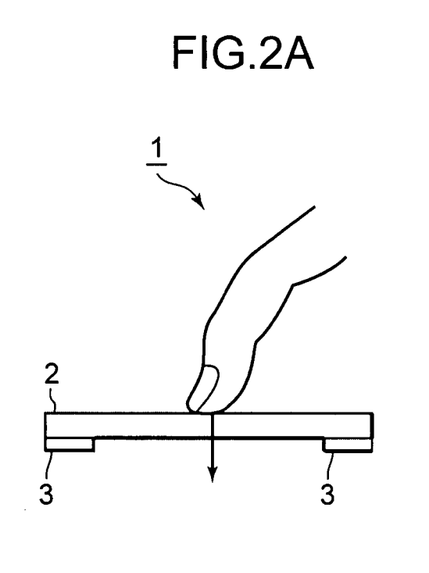
FIGS. 2A and 2B are a schematic sectional view and a plan view both showing an example of input operation involving pressing by a fingertip, in an embodiment of the present invention.
Figure 2B:
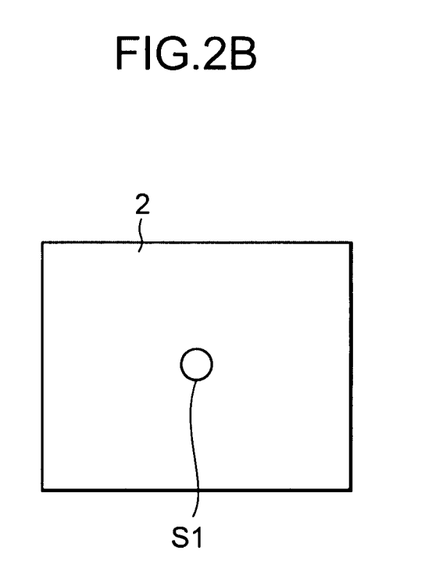
Figure 3A:
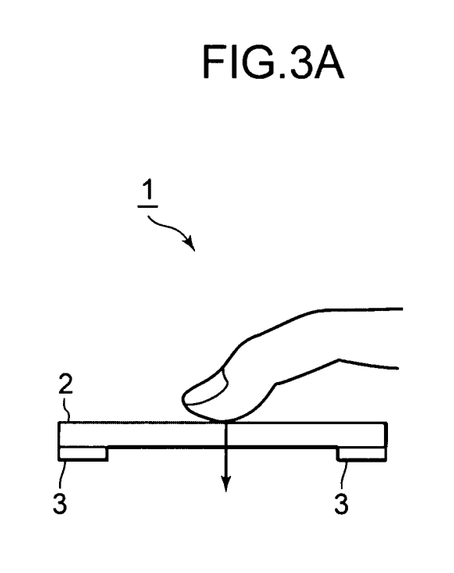
FIGS. 3A and 3B are a schematic sectional view and a plan view both showing an example of input operation involving pressing by a finger pad, in an embodiment of the present invention.
Figure 3B:
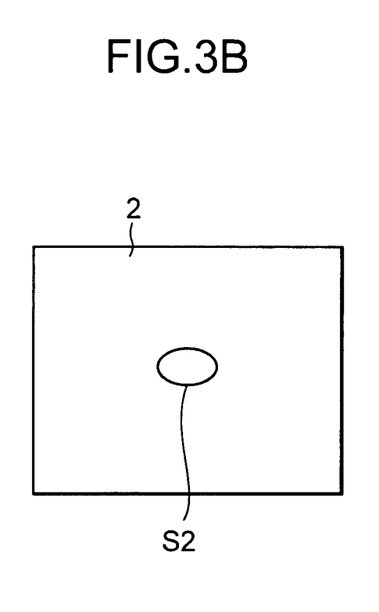

FIGS. 2A, 2B and 3A, 3B show examples of input operation to the input device 1 using a finger or the like. FIGS. 2A and 2B are a schematic sectional view and a plan view both showing the control panel (the surface of the contact sensor section 2) of an input section of the input device 1 which a user presses by erecting a finger and thus with a fingertip. During the input operation, the contact area of the contact sensor section 2 occupied by the fingertip equals a small area S1 such as shown in FIG. 2B. FIGS. 3A and 3B are a schematic sectional view and a plan view both showing the control panel (the surface of the contact sensor section 2) of the input device 1 which the user presses by laying down the finger and thus with the finger pad. The contact area of the contact sensor section 2 touched by the finger pad equals a large area S2 such as shown in FIG. 3B. That is, compared with the area S1, which is an area of the contact sensor section 2 surface touched by the fingertip, the area S2 touched by the finger pad is larger (wider). These areas S1, S2 can be clearly distinguished by using a threshold St of a specified area as a boundary. Therefore, by pressing the input device 1 by erecting a finger and thus with a fingertip, the user can perform first processing for zooming in on an image in response to the pressing force. Similarly, by pressing the input device 1 by laying the finger down and thus with the finger pad, the user can perform second processing for zooming out on the image in response to the pressing force.

Figure 4:
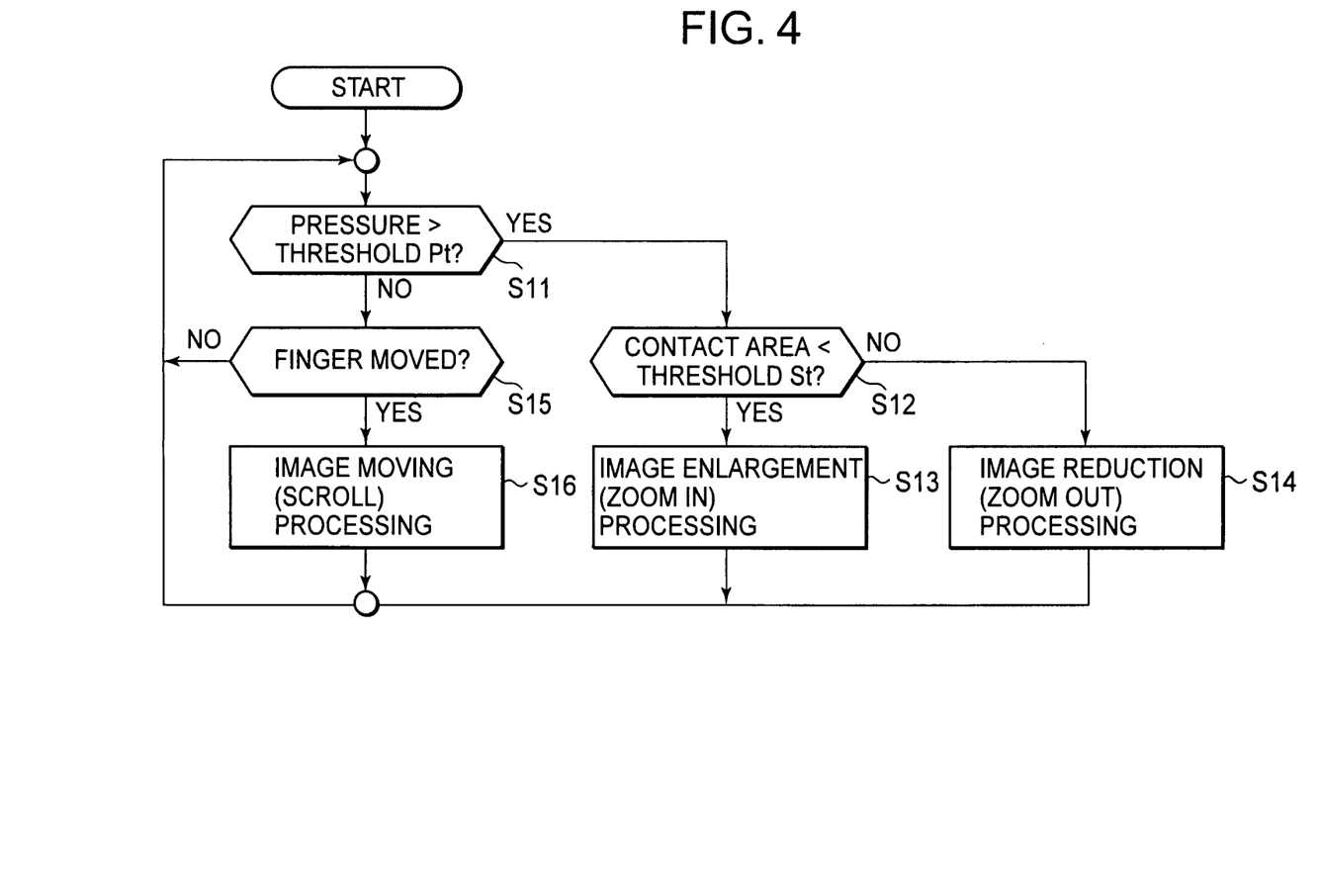
FIG. 4 is a flowchart for illustrating operation in an embodiment of the present invention.

FIG. 4 is a flowchart for illustrating operation for switching such first and second processing in which a value (or controlled variable) varies with pressing force, on the basis of contact area. In an example of FIG. 4, third processing is further added, in which a value (or controlled variable) varies with contact position of a finger or the like in the contact sensor section. Moreover, as the first and second processing, zoom-in and zoom-out processing for displaying an image is taken as examples, and as the third processing, image moving (scroll) processing for moving a display area over an image covering a wide area is taken as an example.

In FIG. 4, when a user performs input operation to the input device 1 of FIG. 1, it is determined in step S11 whether or not a pressure applied to the above-mentioned pressure sensor sections 3 and detected by the pressure detection circuit 43 is greater than a specified threshold Pt. This step is taken to determine whether the user merely touches the control panel (the surface of the contact sensor section 2) of the input device 1 with the finger, or strongly pushes it down with his/her finger to positively apply a pressing force, and corresponds to on/off determination as to the above-mentioned first and second processing functions. That is, when the pressure detected is greater than the specified threshold Pt, the first and second processing functions are turned on, whereas when it is below the specified threshold Pt, these functions remain turned off.

When it is determined to be YES (the detected pressure is greater than the specified threshold Pt) in step S11, the processing proceeds to step S12, to determine whether or not a contact area detected by the contact detection processing circuit 42 connected to the contact sensor section 2 of FIG. 1 mentioned above, is smaller than the specified area threshold St. If it is determined in step S12 that the contact area detected is smaller than the threshold St (YES), the processing proceeds to step S13 to perform the zoom-in processing, whereas if the contact area detected is determined to be equal to or greater than the threshold St (NO), the processing proceeds to step S14 to perform the zoom-out processing. Both the zoom-in processing in step S13 and the zoom-out processing in step S14 involve a change of a value or a controlled variable (the zoom-in/zoom-out level) in response to a pressing force (pressure) value detected by the above-mentioned pressure detection circuit 43. In the zoom-in processing in step S13, a display image is enlarged with increasing pressing force, whereas in the zoom-out processing in step S14, a display image is reduced with decreasing pressing force. Thus, control is effected in opposite directions. After completing steps S13 and S14, the processing returns to step S11.

When it is determined to be NO (the pressure detected is equal to or smaller than the threshold Pt) in step S11, the processing proceeds to step S15, to determine whether or not the contact position of the finger in the contact sensor section 2 has moved (whether or not a finger movement has been detected). If NO (no finger movement), the processing returns to step S11, whereas if YES (a finger movement has been detected), the processing proceeds to step S16. In step S16, the image moving (scroll) processing for moving the image in response to finger movements is performed. After completing step S16, the processing returns to step S11.

Here, step S12 of FIG. 4 corresponds to the processing performed by the area determination circuit 44 of FIG. 1 mentioned above. When the contact area detected is smaller than the threshold St, the switching selection circuit 45 is caused to select the terminal a, to supply the pressure detection signal from the pressure detection circuit 42 to the first processing function section 51 via the terminal 46, whereby to cause the function section 51 to perform the zoom-in processing of step S13. When the contact area detected is equal to or greater than the threshold St, the switching selection circuit 45 is caused to select the terminal b to supply the pressure detection signal from the pressure detection circuit 42 to the second processing function section 52 via the terminal 47, whereby to cause the function section 52 to perform the zoom-out processing of step S14. The determination as to whether pressing operation has been performed or not in step S11 may be made by the pressure detection circuit 43 of FIG. 1, and it may be arranged such that a result of the determination is supplied to the contact detection processing circuit 42. Whether or not the finger has moved in step S15 is determined by the contact detection processing circuit 42, and the contact position information signal detected is supplied to the third processing function section 53 via the terminal 48, whereby to cause the function section 53 to perform the image moving (scroll) processing of step S16. It should be noted that the circuit configuration shown in FIG. 1 may be implemented by hardware, but may, of course, be implemented, in part or in whole, by software as well.

Figure 5A:
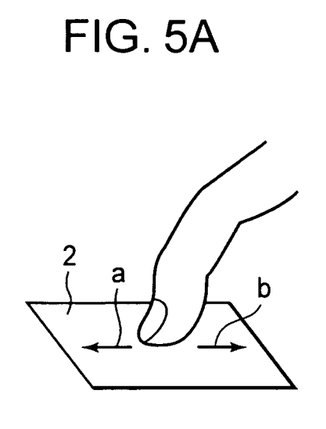
FIGS. 5A, 5C, 5E are schematic perspective views all showing a specific example of input operation in an embodiment of the present invention.
Figure 5B:
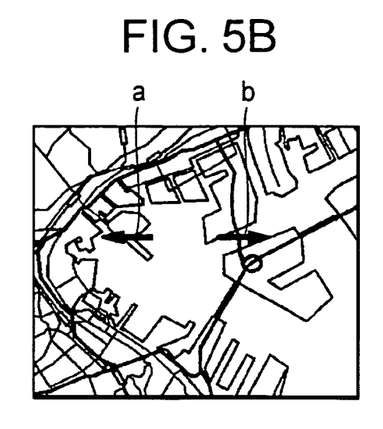
FIGS. 5B, 5D, 5F are schematic plan views respectively showing display screens corresponding to FIGS. 5A, 5C, 5E.
Figure 5C:
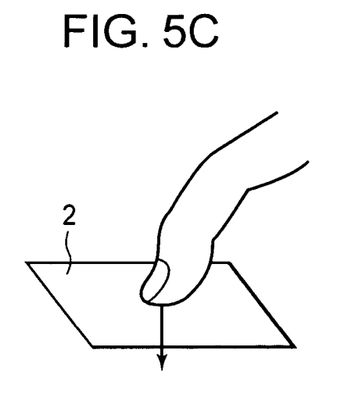
Figure 5D:
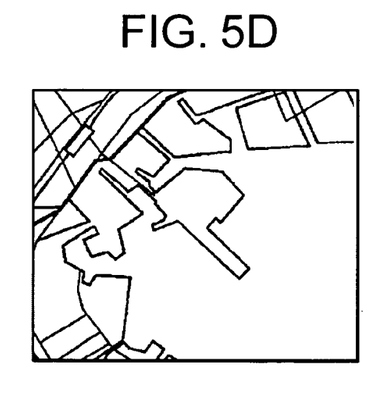
Figure 5E:
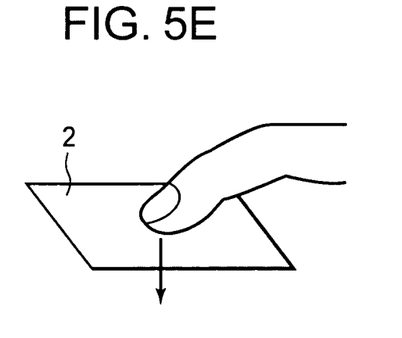
Figure 5F:
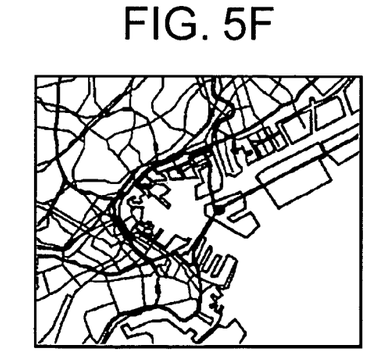

Next, FIGS. 5A to 5F are diagrams showing, as a more specific example, how input operation is related to display screens, in a case where the embodiment of the present invention is applied to a so-called navigation system. As shown in FIG. 5A, with respect to the surface of the contact sensor section 2, which serves as the control panel of an input device 1 such as described above, when a user merely touches the surface (with no pressure applied thereto) and moves his/her finger in directions indicated by arrows a, b, the user can move (scroll or pan) an image of a map displayed on a display screen in the directions indicated by the arrows a, b, as shown in FIG. 5B. The operation applies similarly to directions orthogonal to the directions of the arrows a, b, whereby the user can display the map while moving it every direction. With a desired position displayed through such image movement, when the user presses the control panel (the surface of the contact sensor section 2) by erecting his/her finger and thus with the fingertip (touching an area smaller than the threshold St) to apply pressure thereto as shown in. FIG. 5C, the user can zoom in on the map as shown in FIG. 5D. Moreover, with the desired position displayed, when the user presses the control panel (the surface of the contact sensor section 2) by laying his/her finger down and thus with the finger pad (touching an area greater than the threshold St) to apply pressure thereto as shown in FIG. 5E, the user can zoom out on the map as shown in FIG. 5F. During the operation, the user can change the zoom level by changing pressure he/she applies with the finger. Specifically, when erecting the finger and increasing the pressing force thus with the fingertip, the user can increase the zoom-in level, and when decreasing the pressing force, the user can decrease the zoom-in level to go back to the display neither zoomed in (nor zoomed out) with no pressure applied. Then, when laying the finger down and increasing the pressing force thus with the finger pad, the user can further zoom out on the image, and when decreasing the pressing force, the user can decrease the zoom-out level up to the display neither zoomed out (nor zoomed in) with no pressure applied.

Figure 6:
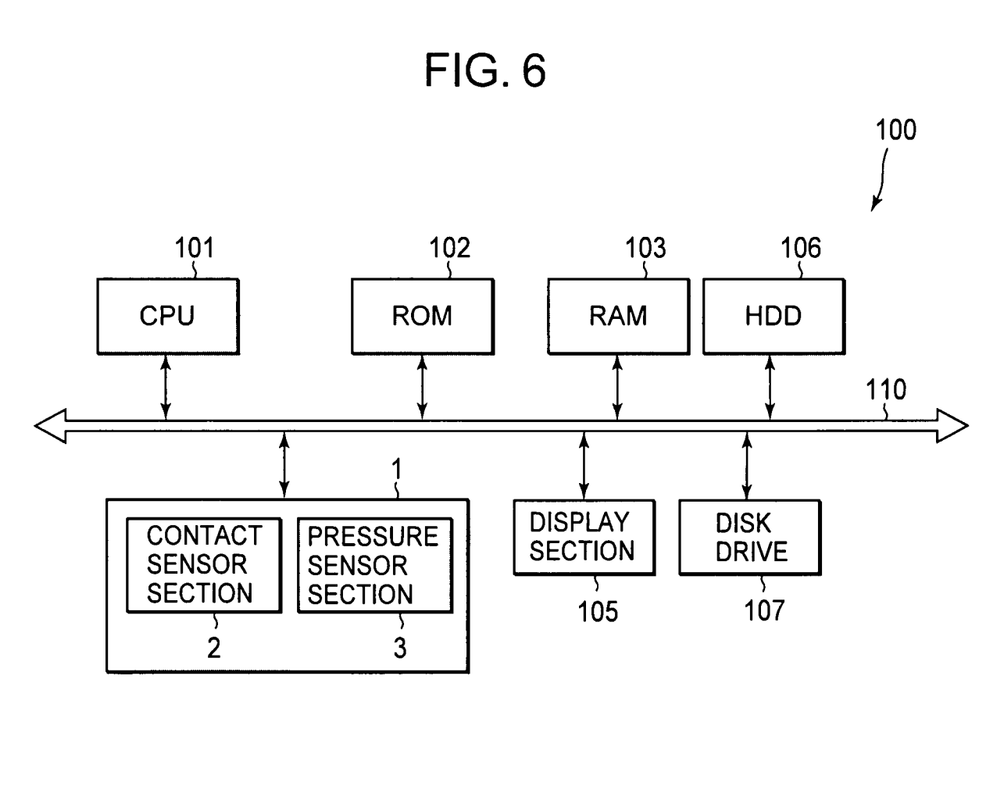
FIG. 6 is a block diagram showing an example of an information processing apparatus used in an embodiment of the present invention.

FIG. 6 is a block diagram showing an example of an information processing apparatus 100 using an input device 1 such as described above. In FIG. 6, to a bus 110 connected to a CPU 101, there are connected a ROM 102 having programs and data stored therein, and a RAM 103 for storing data being processed. The input device 1 is connected to this bus 110. The CPU 101 executes various processing according to a program stored in the ROM 102 or the program loaded into the RAM 103. The RAM 103 also stores data and the like necessary for the CPU 101 to execute the various processing, as appropriate.

The input device 1 has, as described with reference to FIG. 1, the contact sensor section 2 and the pressure sensor sections 3, and outputs a signal in which a contact area detected by the contact sensor section 2 is discriminated at a specified threshold whereby a pressure value detected by the pressure sensor sections 3 is interpreted in one of two directions, a positive or a negative direction from 0. Here, the control section 4 of FIG. 1 may be provided as an interface circuit with respect to the internal circuitry of the input device 1 or the bus 110. However, the control section 4 may be implemented software-wise, in part or in whole, using the CPU 101 (and the ROM 102, the RAM 103, and the like), as necessary. It should be noted that specific examples of the input operation to the input device 1 by a finger or the like are as described with reference to FIGS. 2-5 above, and thus their description will be omitted.

To the bus 110 of FIG. 6, there are connected, as necessary, a display section 105, a hard disk drive (HDD) 106, a disk drive 107 for reproducing and/or recording data from/into CDs or DVDs (Digital Versatile Discs (trademark)), and the like. For example, if this information processing apparatus 100 is supposed to be a so-called navigation system, the apparatus 100 reproduces a CD-ROM or a DVD-ROM having map data recorded thereon with its disk drive 107, and displays the acquired map data on its display section 105 such as an LCD (Liquid Crystal Display) or the like. In addition, if communication circuitry, tuner circuitry, and the like are added or if unnecessary circuitry is eliminated, as necessary, the information processing apparatus 100 can, of course, be configured to be a personal computer, a hard disk recorder, a television receiver, or other electronic equipment. Moreover, the present invention may also be applied to a so-called touch panel disposed on the surface of a display screen as a transparent plate-shaped member or a transparent film to detect contact by a finger or the like. In this case, a transparent type of the contact sensor section 2 shown in FIG. 1 above may be disposed on the display screen, to cause the pressure sensors 3 to detect a pressing force applied to this transparent contact sensor 2. Alternatively, a touch panel serving as the contact sensor section may be stuck to the surface of a plate-shaped display member such as an LCD panel, and the pressure sensors may be disposed on the underside of the plate-shaped display member, whereby to detect a pressing force applied through the touch panel to the pressure sensor sections via the plate-shaped display member.

Figure 7A:
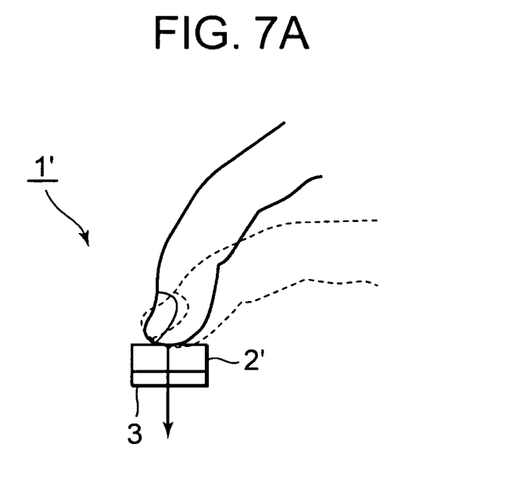
FIGS. 7A and 7B are a schematic sectional view and a schematic plan view both showing an input device which is another embodiment of the present invention.
Figure 7B:
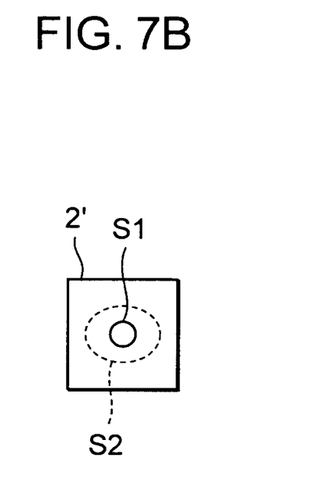

In the above-described embodiment, the contact sensor section 2 has even the function of detecting a contact position of a finger or the like. However, any contact sensor section 2 may be acceptable as long as it can detect at least a contact area. FIGS. 7A and 7B are a schematic sectional view and a schematic plan view both showing an input device 1' having such a contact sensor section 2' capable of detecting a contact area, and the pressure sensor sections 3.

In FIGS. 7A and 7B, the pressure sensor sections 3 are provided on the underside of the contact sensor section 2' that detects a contact area when a finger or the like touches its surface, whereby a force from the finger or the like pressing the contact sensor section 2' is applied to the pressure sensor sections 3. Similarly to the input device 1 described above with reference to FIG. 1 above, an area S1 detected when a user applies pressure to the contact sensor section 2' by erecting his/her finger and thus with the fingertip is related to an area S2 detected when the user applies pressure to the contact sensor section 2' by laying his/her finger down and thus with the finger pad as S1<S2. Consequently, the areas S1, S2 can be distinguished by setting an appropriate threshold St. By pressing the input device 1' by erecting the finger and thus with the fingertip, the user can perform first processing for, e.g., zooming in on an image in response to the pressing force detected by the pressure sensor sections 3, whereas by pressing the input device 1' by laying his/her finger down and thus with the finger pad, the user can perform second processing for, e.g., zooming out on the image in response to the pressing force detected.

Figure 8:
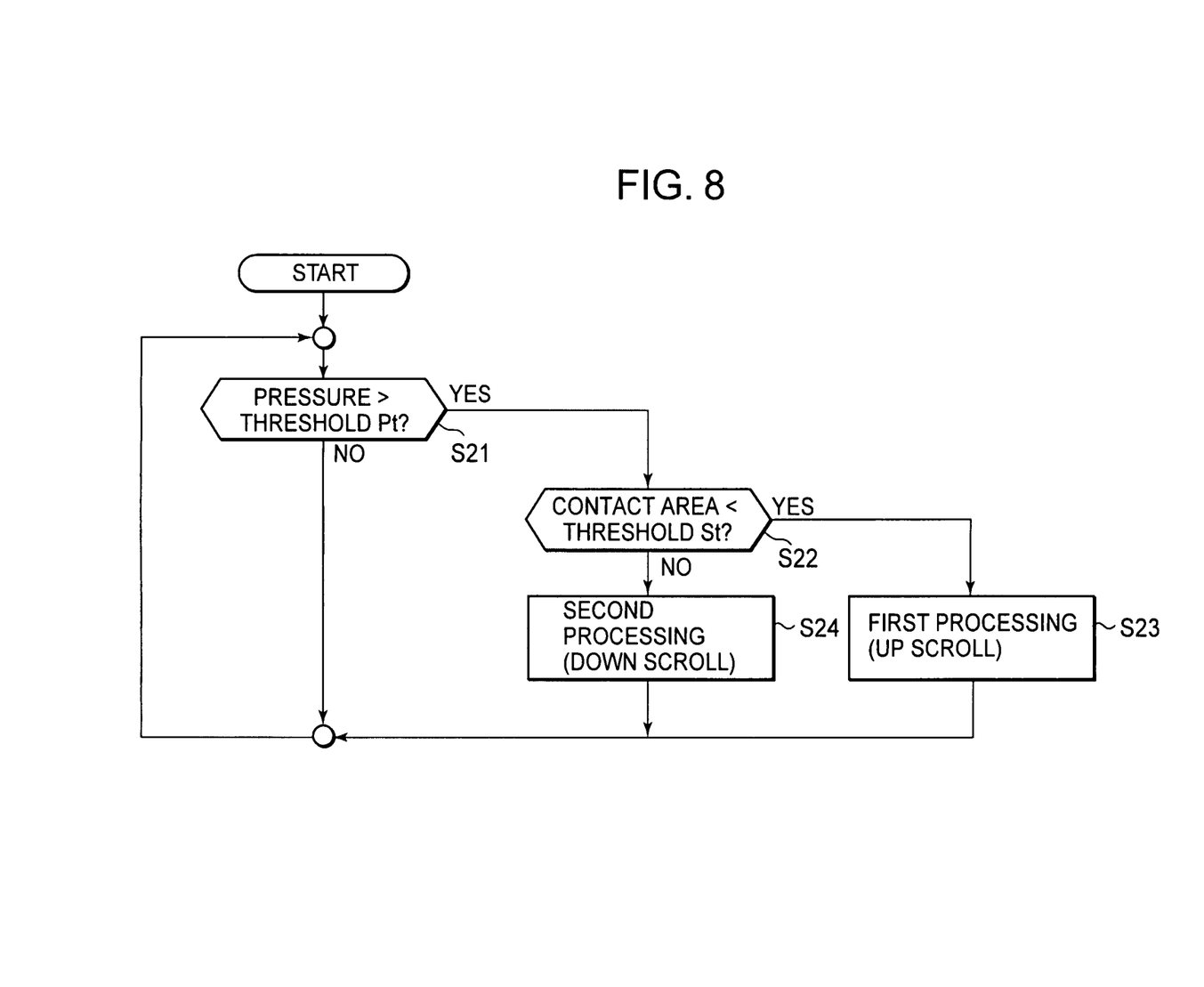
FIG. 8 is a flowchart for illustrating operation in another embodiment of the present invention.

FIG. 8 is a flowchart for illustrating operation of switching the first and second processing for varying a value (or controlled variable) with such pressing forces, on the basis of contact area.

In a first step S21 of FIG. 8, whether a pressure detected by the above-mentioned pressure sensor sections 3 is greater than the specified threshold Pt or not is determined. When the detected pressure is greater than the specified threshold Pt, the processing proceeds to step S22, whereas when the detected pressure is equal to or smaller than the specified threshold Pt, the processing returns to step S21. In step S22, whether a contact area detected by the contact sensor section 2' is smaller than the above-mentioned specified threshold St or not is determined. When the detected contact area is determined to be smaller than the specified threshold St (YES) in step S22, the processing proceeds to step S23, to perform the first processing. When the detected contact area is determined to be equal to or greater than the threshold St (NO), the processing proceeds to step S24, to perform the second processing. As the first and second processing, different types of processing may be adopted, for varying a value (or controlled variable) with a pressing force applied during operation with a finger. For example, it may be arranged such that the first processing is up scroll processing, and that the second processing is down scroll processing. Alternatively, as mentioned above, the first processing may be the zoom-in processing, whereas the second processing may be zoom-out processing, for displaying a map or the like.

Figure 9A:
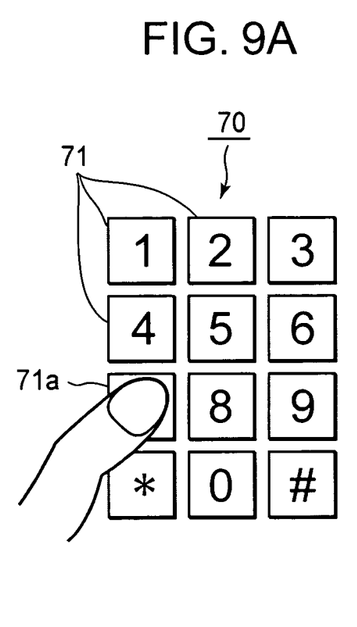
FIG. 9A is a schematic plan view of an input device which is still another embodiment of the present invention.
Figure 9B:
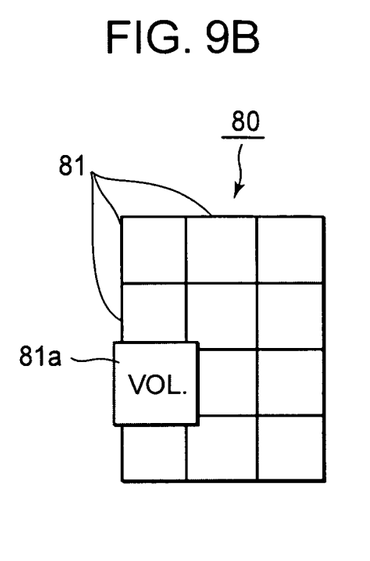
FIG. 9B is a diagram showing a display screen of the input device of FIG. 9A.

Next, FIGS. 9A and 9B show an example of an input device 70 as still another embodiment of the present invention. The input device 70 is an array of configurations such as described with reference to FIGS. 7A, 7B above. FIG. 9A is a schematic plan view of the input device 70, in which a total of twelve buttons is arranged in, e.g., a 4×3 matrix-like configuration. Each of the buttons is a button 71 having a configuration of the input device 1' such as described with reference to FIGS. 7A, 7B above. FIG. 9B shows an example of an image indicating functional information assigned to one of these buttons 71, which serves as a control input section. The buttons 71 of the input device 70 shown in FIG. 9A are displayed as soft buttons 81 of a so-called soft key pad 80 on a display screen of FIG. 9B.

In such a configuration, when a user touches, e.g., a button 71a of the buttons 71 in the input device 70 with his/her finger, a soft button 81a of the soft key pad 80 on the display screen corresponding to this button 71a is highlighted. In an example of FIG. 9B, the soft button 81a corresponds to a volume (VOL.) control button. When the user presses the button 71a by erecting the finger and thus with the fingertip (i.e., covering a small contact area as mentioned above), the volume is increased, whereas when the user presses the button 71a by laying down the finger and thus with the finger pad (i.e., covering a large contact area), the volume is decreased. Thus, bi-directional control is effected. Additionally, various functions may be assigned to the respective buttons 71. For example, brightness may be varied to be brighter and darker, and hue may also be varied in both a plus (+) direction and a minus (−) direction, Moreover, a display button may be varied in two directions, i.e., to zoom in and zoom out.

It should be noted that in the example of FIG. 9B, the function name (VOL.) is indicated only on the soft button 81a corresponding to the button touched by the finger. However, other soft buttons 81 not touched by the finger may, of course, have function names, icons representing functions, or the like respectively indicated thereon.

In the embodiment of FIGS. 9A and 9B, function information about one or more functions assigned to the buttons 71 forming the control input sections of the input device 70 may be displayed as the soft buttons 80 of the soft key pad 80 on display means, not shown. A contact detection result from the above-mentioned contact sensor section, which serves as the contact detection means, is reflected in the above-mentioned function information displayed. As a result, when the above-mentioned control input section is pressed with the contact detection result, which is reflected in the function information, the first signal or the second signal is outputted.

As is apparent from the foregoing, the embodiment of the present invention uses a combination of a value about a contact area touched by a finger and a pressure value to identify a control mode. That is, the contact area S1 by the fingertip applying pressure is related to the contact area S2 by the finger pad (laying the finger down) applying pressure as S1<S2. These areas S1, S2 are distinguished by setting an appropriate threshold St, whereby under each distinguished state, a pressure value can be used in two directions, positive and negative, such as zooming in when pressure is applied by the fingertip (processing the pressure as a positive value) and zooming out when pressure is applied with the finger laid down (processing the pressure as a negative value). That is, two types of control modes, in each of which a value (or controlled variable) varies with pressure can be switched according to a contact area touched by the finger.

It should be noted that the present invention is not limited to the above-described embodiments, but may also be applied to an embodiment in which, e.g., the first and second processing includes, in addition to zooming in/zooming out, any two kinds of processing, in each of which a value or controlled variable varies with pressure, such as controlling brightness to levels brighter (positive) or darker (negative) than a reference level (0), switching pages or layers toward the positive side or the negative side from a reference page or layer in a plurality of pages or layers.

Furthermore, the above embodiment has been described in terms of a hardware configuration. However, the present invention is not limited to this configuration, but may be realized by causing the CPU to execute the processing by means of a computer program. In this case, the computer program may be provided by recording on a recording medium, or by transmission via the Internet or a like transmission medium.

The present invention contains subject matter related to Japanese Patent Application JP 2005-168699 filed in the Japanese Patent Office on Jun. 8, 2005, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method comprising:
an input step; and
a processing step including performing processing in response to a signal obtained by the input step;
wherein the input step includes:
a contact detection step including detecting a size of a contact area by detecting a physical contact with a control input section;
a pressure detection step including detecting a pressure applied by the physical contact;
an area determination step including comparing the size of the contact area with a size of a predetermined contact area threshold; and
a control step including outputting signals in response to detection of outputs produced by the area determination step and the pressure detection step;
wherein the control step executes:
a first processing by a first signal carrying a value which varies in response to the pressure detected by the pressure detection step when the result of the comparison indicates the size of the contact area is equal to or smaller than the size of the predetermined contact area threshold, and
a second processing by a second signal carrying a value which varies in response to the pressure detected by the pressure detection step when the result of the comparison indicates the size of the contact area is greater than the size of the predetermined contact area threshold.

2. The information processing method according to claim 1, wherein:
detecting a physical contact with the control input section further comprises detecting a position of a physical contact with the control input section.

3. The information processing method according to claim 1, wherein the control step further comprises outputting the first or second signal when the detected pressure is greater than a predetermined pressure threshold.

4. The information processing method according to claim 1, further comprising:
   displaying function information about one or more functions assigned to the control input section; and
   reflecting the contact detection result from the contact detection step in the function information displayed;
   wherein the control input section outputs the first or second signal if the control input section is pressed while the contact detection result is being reflected in the function information displayed.

5. A storage medium that stores a program for causing a computer to execute an information processing method, the information processing method comprises an input step; and
   a processing step including performing processing in response to a signal obtained by the input step;
   wherein the input step includes:
   a contact detection step including detecting a size of a contact area by detecting a physical contact with a control input section;
   a pressure detection step including detecting a pressure applied by the physical contact;
   an area determination step including comparing the size of the contact area with a size of a predetermined contact area threshold; and
   a control step including outputting signals in response to detection of outputs produced by the area determination step and the pressure detection step;
   wherein the control step executes:
   a first processing by a first signal carrying a value which varies in response to the pressure detected by the pressure detection step when the result of the comparison indicates the size of the contact area is equal to or smaller than the size of the predetermined contact area threshold, and
   a second processing by a second signal carrying a value which varies in response to the pressure detected by the pressure detection step when the result of the comparison indicates the size of the contact area is greater than the size of the predetermined contact area threshold.

6. An input device comprising:
   a contact detector configured to detect a size of a contact area by detecting a physical contact with a control input section;
   a pressure detector configured to detect a pressure applied by the physical contact;
   an area determinator configured to compare the size of the contact area with a size of a predetermined contact area threshold; and
   a controller configured to output signals in response to detection of outputs from the area determinator and the pressure detector;
   wherein the controller is configured to output:
   a first signal carrying a value which varies in response to the pressure detected by the pressure detector when the result of the comparison indicates that the size of the contact area is equal to or smaller than the size of the predetermined contact area threshold,
   a second signal carrying a value which varies in response to the pressure detected by the pressure detector when the result of the comparison indicates that the size of the contact area is greater than the size of the predetermined contact area threshold.

* * * * *